United States Patent Office 2,821,514
Patented Jan. 28, 1958

2,821,514

FIRE RESISTANT COMPOSITION OF SILICATE, REFRACTORY AND NITRILE TYPE RUBBER AND ARTICLE CONTAINING THE SAME

Donald V. Sarbach, Cuyahoga Falls, and Vernon G. Boger, Akron, Ohio, assignors to The B. F. Goodrich Company, New York, N. Y., a corporation of New York No Drawing. Application August 18, 1953
Serial No. 375,069

18 Claims. (Cl. 260—29.7)

This invention relates to new fire resistant or insulating compositions of matter and to articles of manufacture containing the same. More particularly, the present invention relates to compositions comprising an alkali metal silicate adhesive, an insulating refractory and a rubbery polymer containing butadiene-1,3 and acrylonitrile.

Many compositions have been proposed in the past as coatings for base materials, such as steel plate, to protect the same from fire and high temperatures for a given period of time before they melt or burn. However, such compositions in many instances require the use of organic solvents which are expensive and require special apparatus such as hoods and the like to prevent fire during application and the solvent itself may be toxic to the workman. Such compositions, moreover, require that the surface of the base material be specially prepared. Moreover, these compositions while adherent to the base may flake or chip readily on being subjected to mechanical shock so that they have little impact resistance and cannot be subjected to handling even though their fire resistant properties are satisfactory. On the other hand, such compositions may adhere very well to a base material but be destroyed at relatively low temperatures. Obviously then, the combination of properties desired in a fire resistant composition are many and are necessary if proper protection is desired.

It, therefore, is an object of the present invention to provide a new fire resistant and insulating coating composition.

Another object of the present invention is to provide a fire resistant and insulating coating composition which is adherent, essentially free of checks and having a high resistance to mechanical and thermal shock and to repeated variations in temperature.

Still another object is to provide a fire and insulating coating composition characterized by stability, ease of application, non-toxicity and non-flammability.

Yet another object of the present invention is to provide an article protected by a coating of a composition which has high impact strength and high thermal resistance.

A further object of the present invention is to provide an article having its surface protected with an adherent, impact and fire resistant coating.

A still further object of the present invention is to provide an article with a fire resistant and insulating coating composition which can be subjected to repeated wide variations in temperatures without separation from the surface of the article or other change.

These and other objects and advantages of the present invention will become more apparent from the following detailed description and examples.

It has now been found according to the present invention that a composition composed of from 12 to 52% by weight of at least one silicate of an alkali metal, from 10 to 34% by weight of a rubbery polymer comprising a butadiene hydrocarbon and the balance acrylonitrile, from 21 to 74% by weight of an insulating refractory and water in an amount at least sufficient to provide a tacky workable dispersion is readily applied to a base material and on drying will form a coating having excellent fire resistant and insulating properties to thereby protect for extended periods of time base materials such as steel, wood, and the like. The composition on drying is adherent and impact resistant and exhibits little or no crazing. In very thin coatings it will protect base materials for some time at temperatures of about 4000° F. Further improvements are realized by incorporating in the composition a minor amount of a low temperature fusion point inorganic gassifying agent which tends to increase the insulating values of the coating.

The alkali metal silicate can be one or more silicates selected from the group consisting of lithium, sodium, potassium, rubidium and cesium silicates. Preferably, due to availability and ease of handling only the sodium and potassium silicates, or mixtures thereof, are used. The ratio of alkali metal oxide to silicon dioxide may vary from 1:1 to 1:4 as exemplified by the compounds $Na_2SiO_3$ and $Na_2Si_4O_9$. These, with water, form various silicate solutions, the water glass solutions being preferably used in the practice of this invention. Still other sodium and potassium silicates can be employed such as $K_2Si_4O_9$, $Na_2Si_3O_7$, $K_2SiO_3$ and $K_2Si_2O_5$. The silicate is added to the other ingredients preferably in the form of water glass although solutions of from 10 to 75% alkali metal silicates total solids can be employed and, if desired, the silicates can be added in dry form, for the water present in the polymer latex or added to the system will be sufficient to dissolve the silicate and render the alkali metal silicate tacky or adhesive-like. Obviously, if a solid, the silicate should be broken up or ground up and the liquid warmed to facilitate dissolution. The amount of alkali metal silicate employed will vary from 12 to 52% by weight of the composition on a dry weight basis. By dry weight basis is meant herein free of residual entrapped water and water of hydration. Outside of these ranges, the composition becomes too stiff to handle, is not adherent, and may crack or craze excessively on drying. Preferably, from 22 to 52% by weight of the silicate provides with the other ingredients the best degree of adherence, impact resistance, flame resistance, and freedom from cracking.

The polymer employed in the present composition is a rubbery polymer containing butadiene and acrylonitrile. In place of acrylonitrile, methyl, ethyl or chloroacrylonitriles can be used. Moreover, one or more of these nitriles in mixtures likewise can be used successfully. Preferably, a rubbery acrylonitrile polymer containing at least about 50% butadiene hydrocarbon is employed. Examples of butadiene hydrocarbon monomers copolymerizable with acrylonitrile monomer are those open chain conjugated dienes having from 4 to 8 carbon atoms such as butadiene-1,3, isoprene, 2,3-dimethyl butadiene-1,3, 1,4-dimethyl butadiene-1,3, 1,3-pentadiene, methyl pentadiene and the like and mixtures thereof. Moreover, the acrylonitrile-butadiene polymer can contain at least one other monomer copolymerizable therewith such as styrene, chlorostyrene, methyl acrylate, methyl methacrylate, ethyl acrylate, ethyl methacrylate, 2-vinyl pyridine, vinyl ketones such as methyl vinyl ketone, vinyl ethers such as vinylidene chloride, and the like, and mixtures thereof. The amount of acrylonitrile present in the polymer can vary from 10 to 50% by weight, although preferably from about 30 to 45% acrylonitrile and from 55 to 70% butadiene, especially butadiene-1,3, are utilized. The polymer is employed generally in neutral or alkaline latex form containing from 20 to 65% total solids. For ease of application and mixing with other components it is preferably employed dispersed in latex in an amount of 35–55% total solids. It will be understood that part of the water necessary may be added to the system or be available from the alkali metal silicate solution so that a rather viscous latex can be employed or conversely a highly fluid latex can have its viscosity reduced to the desired amount by addition of viscous alkali metal silicate solution or solid or by addition of insulating refractory. On a dry weight basis the amount of polymer employed in the composition varies from 10 to 34% by weight and preferably from 10 to 28% by weight. Outside of the ranges of components disclosed herein, the composition on drying has little impact resistance and exhibits crazing, and on subjecting to flame tests becomes brittle and cracked.

The insulating refractory used in the composition of the present invention can be any insulating refractory compatible with the alkali metal silicate and rubbery butadiene acrylonitrile polymer and having high melting points and insulating values. Examples thereof are diatomaceous earth, alumina, fire clay, magnesia, asbestos, slag, vermiculite, and the like, and mixtures thereof. The insulating refractory should desirably be pulverized or finely divided to facilitate dispersion in the composition and to provide a smooth, homogenous, appearing composition and a coating having a high degree of coverage although the particles thereof can range in size from those considered coarse to those which are essentially dusts or powders. The amount of insulating refractory employed in the composition can range from 21 to 74% by weight. Coatings having refractory contents outside of this range exhibit crazing and afford little protection to the material to be protected. Preferred compositions contain from 21 to 67% of insulating refractory and show the best combination of properties such as adherence, craze resistance, and impact and fire resistance.

Water in an amount of from 70 to 500% by weight, based on the combined weights of the alkali metal silicate and rubbery polymer, is employed in the practice of the present invention. At 70% water content the mass is very viscous and thick but can be handled. Amounts of water less than this are not desirable and require too much mixing to make into a trowable or sprayable composition and may even set up into a hard mass which cannot be repulverized and dispersed. On the other hand, amounts of water greater than 500% produce compositions which settle out on standing or which require repeated application and drying to obtain a coating of the desired thicknesses and accordingly are deemed impracticable. It is preferred to employ compositions containing from 160 to 440% by weight of water based on the combined weights of the alkali metal silicate and rubbery polymer, for they are readily sprayed, dipped, troweled, or roller or spun coated onto any rigid surface of metal, glass, wood, ceramics and the like. The water in the composition is obtained from the latex and alkali silicate or water glass and additional water is added to bring the total water content within the broad and preferred ranges set forth above. It is a feature of the present composition that non-toxic, non-flammable solvents are employed so that when applying the composition, special precautions such as hoods and explosion proof apparatus need not be used. Moreover, the composition can be stored indefinitely in closed containers with no noticeable separation out of the components of the dispersion. It also can be subjected to repeated freezing and melting without separation of the components of the dispersion. Furthermore, the water itself is not critical, for distilled, tap, or city water can be used with equal facility.

Improvements in insulating value of the composition at elevated temperatures can be made by the addition of a very minor amount of a low fusion point inorganic gassifying material for the insulating refractory. Such material apparently absorbs heat during fusion and thus adds to the insulating effect. Since the material tends to fuse at temperatures of 2000 to 3000° F., it prevents the composition from flaking off before the fusion temperature of the insulating refractory is reached. Further, such material emits gases and thereby tends to expand the coating increasing its insulating and fire resisting properties. It has been found that an eutectic mixture of sodium and potassium carbonates (50% by weight sodium carbonate and 50% by weight potassium carbonate) serves admirably for this purpose and is used in an amount of from 1 to 8% by weight based on the weight of the insulating refractory. Amounts appreciably less than 1% by weight offer no visible improvement whereas above about 8% they do not appear to improve results and thus are wasteful and to be avoided. Further, large amounts of such material may tend to actually make the coating so porous and flimsy that its fire resisting ability is destroyed. In place of the carbonates, the bicarbonates of sodium and potassium may be used. Further, other low fusion point, gassifying compounds or mixtures well known to those skilled in the art can be employed.

The method of preparing the composition is not too critical, it being only necessary that the refractory materials be added to the silicate prior to the addition of the latex to prevent coagulation of the latex. Alternatively all the materials can be mixed together except the latex which is finally added and dispersed throughout the system. The resulting composition can be termed either a dispersion or suspension since it appears to have properties of both types of systems.

It is within the purview of the present invention that the composition disclosed herein can contain antioxidants, dispersing agents, fire retardants, dyes or color pigments as well as germicides, fungicides and the like.

The base material to be coated need not be especially cleaned to receive the composition coating of the present invention although grease and oil should be removed. The composition can be readily applied to degreased steel for example which still contains mill scale or its oxide coating, yet no loss in adhesion is noticed over a steel surface which has been degreased and sand blasted.

A base material having a surface coating of the composition of the present invention may be permitted to air dry at room temperatures for a few hours (depending on the water content of the original composition) or be subjected to temperatures of the order of 212° F. until thoroughly dry. After drying, the coating obtained is hard, adherent, essentially check-free, and impact and fire resistant. It probably contains a minor amount of water in the form of water of crystallization of the silicate and possibly some entrapped free water mechanically held between the particles of the composition or in the polymer. However, the composition appears to be dry and to all intents and purposes, the bulk of the water has been removed. Successive coats of the composition can be built up by repeated spraying or dipping and then drying to obtain the desired thickness or such can be achieved in one application by controlling the water content to the desired amount and, accordingly, the viscosity of the resulting composition. The essentially dry composition coating is alkaline and can be painted or coated with a layer of any water or oil-base paint unaffected by an alkaline surface. The coating is unaffected by most commonly used organic solvents yet can be removed easily by soaking in warm water if desired. Furthermore, cylinders and panels coated with the composition herein described can be subjected to temperatures of −60° F. for 24 hours, then to 160° F. for 24 hours, then back to −60° F. for weeks without affecting the adhesion of the composition or producing cracks as well as without destroying the original impact and fire resistant properties of the composition.

The following examples will serve to illustrate the invention with more particularity to those skilled in the art:

EXAMPLE I

Water glass was poured into a container and a solution of a 50–50% by weight mixture of sodium and potassium carbonates in water added thereto. Asbestos (7.8% retained on 18 mesh, 44.1% retained on 35 mesh, 16.6% retained on 70 mesh, and balance through 70 mesh—USS size) and fire clay (2.32% retained on 200 mesh, 3.23% retained on 325 mesh and balance through 325 mesh—USS size) which had been dry-mixed previously was then added to the carbonate-water glass solution with stirring. Butadiene-1,3 acrylonitrile latex was next added to the mixture and stirred therewith. Finally, water was added in an amount in addition to that already present to give good troweling consistency and the composition thoroughly stirred to produce a homogeneous-appearing dispersion or suspension. The resulting suspension had a tacky-like feeling to the touch somewhat like wet clay or cement. The amounts of ingredients present in the composition were as follows:

| Ingredients | Parts by Weight (grams) (Percent same) | Dry Basis, H₂O Omitted, By Weight | |
|---|---|---|---|
| | | Parts | Percent |
| Sodium disilicate solution (water glass, 39% total solids) | 30.15 | 11.76 | 21.9 |
| Hycar OR-15 (about 55% butadiene-1,3/ 45% acrylonitrile copolymer) latex (39% total solids) | 16.13 | 6.29 | 11.7 |
| Fire clay, particulate | 30.15 | 30.15 | 56.3 |
| Asbestos, refiborized | 5.03 | 5.03 | 9.4 |
| Potassium carbonate | .20 | .20 | .374 |
| Sodium carbonate | .20 | .20 | .374 |
| Water | 18.14 | | |
| Totals | 100.00 | 53.63 | 100.048 |

This composition was readily spread by troweling to form a coating 1/32 inch thick on a piece of sheet fender steel 1/32" x 4" x 12" which has been merely degreased and then allowed to air-dry. After drying, the coating was smooth, without any evidence of cold flow, checks or crazing, and was tightly bound to the steel as evidenced by the fact that it could not be removed therefrom by attempts to insert a knife between the coating and the surface of the sheet steel. Its impact resistance or resistance to mechanical shock was very high in that it did not separate from the metal base after repeated blows from a hammer on the coating (plate suspended on ends by two metal pads) just short of deformation of the metal. Its fire resistance, or resistance to thermal shock, was also very high, for it did not separate from the metal and prevented the metal from becoming hot enough to discolor for 3 seconds when subjected to temperatures of 3700° F.+ in the reducing portion of an oxy-acetylene heating torch flame. On the other hand, an unprotected panel subjected to the same heat treatment melted through in less than 1 to 1½ seconds. With high alloy steel (4130), the coating prevented any heat discoloration for 3 seconds at oxygen flame temperatures up to 4000° F. while an uncoated panel of this steel was severely warped and discolored. The coating tended to fuse at such temperatures but did not separate on impact. On the other hand, a coating containing only a dried water glass-refiberized asbestos composition had excellent adhesion but no impact resistance and blistered and chipped on the flame test. Even the addition of fire clay to this two-component composition did not prevent chipping nor improve impact resistance. Although the high temperatures employed tend to cause slight fusion and discoloration of the insulation coating of the present invention, it does not blister or crack and will still perform its function of protecting the base material. At lower temperatures, for example, at 1900° F. for five minutes, the composition coating was only moderately discolored and could not be separated from the metal by impact. It exhibited no cracks or checks. Thicker coatings will, of course, provide protection for longer periods of time.

EXAMPLE II

The composition of this example was prepared in the same manner as that of Example I except that the amounts of the components were varied as shown below:

| Ingredients | Parts by Weight (Grams) | Percent by Weight | Dry Basis, H₂O Omitted, By Weight | |
|---|---|---|---|---|
| | | | Parts | Percent |
| Sodium disilicate solution, water glass (39% T.S.) | 40.33 | 36.60 | 15.73 | 27.3 |
| Hycar OR-15 latex (39% T.S.—about 55% butadiene-1,3/45% acrylonitrile copolymer) | 16.13 | 14.65 | 6.29 | 10.9 |
| Fire Clay, pulverized | 30.15 | 27.4 | 30.15 | 52.4 |
| Asbestos, fibrous | 5.03 | 4.57 | 5.03 | 8.7 |
| Potassium carbonate | .20 | .182 | .20 | .35 |
| Sodium carbonate | .20 | .182 | .20 | .35 |
| Water | 18.14 | 16.5 | | |
| Totals | 110.18 | 100.084 | 57.60 | 100.00 |

The above composition was then applied as a coating on steel plates and tested in the manner set forth in Example I. It gave results equal to those exhibited by the composition of Example I even though the amount of sodium silicate solution was increased appreciably.

EXAMPLE III

The composition of this example was prepared in the same manner as that of Example I except that the amounts of the components were varied as shown below:

| Ingredients | Parts by Weight (Grams) | Percent by Weight | Dry Basis, H₂O Omitted, By Weight | |
|---|---|---|---|---|
| | | | Parts | Percent |
| Sodium disilicate solution, water glass (39% T.S.) | 30.15 | 51.6 | 11.76 | 50.00 |
| Hycar OR-15 latex (39% T.S.—about 55% butadiene-1,3/45% acrylonitrile copolymer) | 16.13 | 27.65 | 6.29 | 26.80 |
| Fire Clay, pulverized | | | | |
| Asbestos, refiborized | 5.03 | 8.63 | 5.03 | 21.40 |
| Potassium carbonate | .20 | .343 | .20 | .852 |
| Sodium carbonate | .20 | .343 | .20 | .852 |
| Water | 6.66 | 11.4 | | |
| Totals | 58.37 | 100.07 | 23.48 | 99.90 |

The above composition was then applied as a coating on steel panels and tested in the manner set forth in Example I. Its surface condition, impact and fire resistance were equal to that of the coating of Example I and while its ease of application and adhesion were not as good as that of Example I, such was satisfactory. In particular, this example shows that complete elimination of fire clay, and consequently lowering of total refractory content, did not adversely affect the fire and impact resistance properties of the composition.

EXAMPLE IV

The composition of this example was prepared in the same manner as in Example I, except that the amounts of components were varied as shown below:

| Ingredients | Parts by Weight (Grams) | Percent by Weight | Dry Basis, H₂O Omitted, By Weight | |
|---|---|---|---|---|
| | | | Parts | Percent |
| Sodium disilicate solution, water glass (39% T. S.) | 30.15 | 38.5 | 11.76 | 23.40 |
| Hycar OR-15 latex (39% T. S.— about 55% butadiene-1,3/45% acrylonitrile copolymer) | 16.13 | 20.6 | 6.29 | 12.55 |
| Fire Clay, pulverized | 30.15 | 38.5 | 30.15 | 60.10 |
| Asbestos, refiberized | 1.60 | 2.04 | 1.60 | 3.19 |
| Potassium carbonate | .20 | .255 | .20 | .399 |
| Sodium carbonate | .20 | .255 | .20 | .399 |
| Water | | | | |
| Totals | 78.43 | 100.150 | 50.20 | 100.04 |

The above composition was then applied as a coating on a steel panel and tested in the manner disclosed in Example I. The results of the test showed that the coating had properties equivalent in every respect to those afforded by the coating of Example I. This example illustrates the facts that the water present in the water glass and latex is sufficient to provide a homogeneous suspension which can be applied to a base member and meets the varied tests enumerated supra and that the reduction in total refractory content does not deleteriously affect the fire resistance properties of the composition.

Still other compositions were prepared in which the amounts of components were varied. These compositions and the results obtained are shown in Table A below where they are compared with the compositions of Examples I to IV. In the table the amounts of ingredients are based on their solids (or dry) weight alone and the amount of water present is the total available from the water glass, latex and/or free or added water. The actual weights were converted to a percentage basis and add up to essentially 100%.

Further, with respect to Example VIII, the coating was brittle; while in Example IX, the coating checked and lacked adhesion. The compositions used in making the coatings of Examples VIII to X are outside the broad and preferred ranges of ingredients as discussed hereinabove. For example, the composition of Example VIII has no butadiene-1,3 acrylonitrile copolymer and the total refractory content, 74.91% (based on dry silicate, polymer and refractory), is outside the upper limit of the broad range specified—74%. In Example IX, the polymer in an amount of 8.8% is outside the lower limit specified—10% and the refractory is outside the upper limit specified—74%. In Example X, the polymer is in an amount of 9.48% and likewise outside the range. Even more striking differences are noted with respect to the preferred ranges. Accordingly, the presence of butadiene acrylonitrile polymer in definite amounts and definite amounts of refractory and alkali metal silicate are necessary to afford compositions having properties required as described herein.

Additional tests were conducted with compositions similar to that shown in Example I, except that the butadiene-1,3-acrylonitrile polymer was replaced with other organic polymeric substances. After coating steel plates with these compositions they were dried and the opposite sides, free of coating, were attached to thermocouples. The coatings were then subjected to the blast of a torch 14 inches from the surface of the coating. After nine seconds of blast, the temperatures obtained were measured and are shown in the accompanying Table B:

*Table B*

SURFACE TEMPERATURES OF METAL

Uncoated plate—650° F.
Polysulfide rubber—500° F.
Phenol-aldehyde resin—475° F.
Chlorinated rubber—300° F.
Composition coating of present invention—180° F.

*Table A*
VARIATIONS IN COMPOSITION

| | Ingredients and Amounts Thereof in Percent by Weight (Solids and Water) | | | | | | | | Results | | | | |
|---|---|---|---|---|---|---|---|---|---|---|---|---|---|
| Example No. | Sodium Disilicate | Hycar OR-15 | Fire Clay, Particulate | Asbestos Refiberized | K₂CO₃ | Na₂CO₃ | H₂O present (Total) | Total | Ease of application | Surface Condition | Adhesion | Impact Resistance | Flame Resistance |
| I | 11.76 | 6.29 | 30.15 | 5.03 | .20 | .20 | 46.37 | 100.05 | Good | Good | Good | Good | Good. |
| II | 14.3 | 5.72 | 27.4 | 4.57 | .182 | .182 | 47.8 | 100.15 | do | do | do | do | Do. |
| III | 20.14 | 10.8 | | 8.63 | .343 | .343 | 59.9 | 100.16 | Fair | do | Fair | do | Do. |
| IV | 15.0 | 8.03 | 38.5 | 2.04 | .255 | .255 | 36.0 | 100.08 | Good | do | Good | do | Do. |
| V | 13.70 | 7.23 | ¹ 6.97 | 17.60 | .233 | .233 | 54.0 | 99.97 | do | do | do | do | Do. |
| VI | 7.3 | 7.3 | 35.1 | 5.86 | .233 | .233 | 43.9 | 99.93 | do | Checks | Poor | Fair | Do. |
| VII | 8.14 | 16.3 | 20.85 | 3.85 | .1385 | .1385 | 50.8 | 100.22 | do | Slight Checking. | do | Good | Do. |
| VIII | 14.02 | | 36.0 | 6.01 | .239 | .239 | 43.6 | 100.11 | do | Good | Good | Brittle | Blistered. |
| IX | 9.95 | 5.32 | 40.8 | 4.26 | .169 | .169 | 39.2 | 99.87 | do | do | do | Good | Blistered and Cracked. |
| X | 10.1 | 5.41 | 25.9 | 15.57 | .174 | .174 | 42.6 | 99.93 | do | Checks | Poor | do | Do. |

¹ Diatomaceous earth.

The above table shows that compositions falling within the broad and preferred ranges of components as represented by Examples I to V provide the best compositions as to ease of working, adhesion, impact and fire resistance. Compositions represented by Examples VI and VII which fall within the broad range of the present disclosure, while not the best as to surface condition and adhesion are still acceptable as to fire resistance and impact resistance and accordingly meet the prime requisites of the composition of the present invention. On the other hand coatings of compositions represented by Examples VIII to X are not satisfactory as evidenced by the fact that the coatings were blistered or blistered and cracked on the flame test.

The results shown in Table B indicate that the composition coating of the present invention has unexpected insulation value as compared to other materials commonly available. Although all of these compositions contained refractory materials, they did not, with the exception of the composition of the present invention containing butadiene-1,3-acrylonitrile polymer, provide satisfactory results.

Fire resistance tests were conducted on various compositions similar to that of Example I except that the rubber acrylonitrile butadiene polymer was replaced with other materials. The substitute material and the results of the test (as outlined in Example I) are shown in the table below:

Table C
RESULTS OF FLAME TESTS ON VARIOUS MATERIALS

| Material | Condition of Coating |
|---|---|
| Polychloroprene | Blistered and chipped in and around flame area. |
| Natural rubber | Do. |
| "Carbowax" | Poor dispersion. Blisters and cracks. |
| Silicone rubber | Flame burns through coating. Requires curing. |
| Polytetrafluoethylene | Poor adhesion and charring. Requires curing. |
| Chlorinated rubber | Burned through to metal. Coating loose and fell free on impact. |
| Polyvinyl alcohol | Blistering around flame area. |

The above table shows that the use of materials other than rubbery acrylonitrile butadiene copolymer fails to provide the desired results on flame tests and in other particulars such as necessity for curing, lack of adhesion and so forth are unsatisfactory.

In summary, the present invention teaches that a new composition of matter formed of an alkali metal silicate, a rubbery polymer of acrylonitrile and butadiene, and an insulating refractory in certain proportions will provide excellent fire resistance and insulation when applied as a coating to base materials. It has excellent adhesion and impact resistance and can be subjected to repeated freezing without deterioration or change. The composition is non-toxic and does not require special precautions in application.

We claim:

1. A composition of matter capable of forming on a base material when substantially dry an adherent, impact resistant and fire resistant coating and comprising a dispersion comprising essentially water and solids, said solids comprising as essential ingredients on a dry weight basis from 12 to 52% by weight of at least one alkali metal silicate, from 10 to 34% by weight of a rubbery polymer of at least about 50% by weight of an open chain conjugated diene hydrocarbon having from 4 to 8 carbon atoms and from 50 to 10% by weight of a monomer selected from the group consisting of acrylonitrile, methyl acrylonitrile, ethyl acrylonitrile and chloroacrylonitrile and mixtures thereof and from 21 to 74% by weight of a refractory and said water being present in said dispersion in an amount of from 70 to 500% by weight based on the combined weights of said alkali metal silicate and said rubbery polymer.

2. A composition of matter according to claim 1 containing additionally from 1 to 8% by weight, based on the weight of said refractory, of a material selected from the group consisting of sodium and potassium carbonates and bicarbonates and mixtures thereof.

3. A composition of matter according to claim 1 where said polymer contains additionally a copolymerized monomer selected from the group consisting of styrene, chlorostyrene, methyl acrylate, methyl methacrylate, ethyl acrylate, ethyl methacrylate, 2-vinyl pyridine, methyl vinyl ketone, vinylidene chloride and mixtures thereof.

4. A composition of matter capable of forming on a base material when substantially dry an adherent, impact resistant and fire resistant coating and comprising a dispersion comprising essentially water and solids, said solids comprising as essential ingredients on a dry weight basis from 12 to 52% by weight of an alkali metal silicate selected from the group consisting of sodium and potassium silicates and mixtures thereof, from 10 to 34% by weight of a rubbery copolymer of from about 50 to 90% by weight of an open chain conjugated diene hydrocarbon having from 4 to 8 carbon atoms and the balance a monomer selected from the group consisting of acrylonitrile, methyl acrylonitrile, ethyl acrylonitrile and chloroacrylonitrile and mixtures thereof, from 21 to 74% by weight of a refractory and from about 1 to 8% by weight, based on the weight of said refractory, of a material selected from the group consisting of sodium and potassium carbonates and bicarbonates and mixtures thereof and said water being present in said dispersion in an amount of from 160 to 440% by weight based on the combined weight of said alkali metal silicate and said rubbery copolymer.

5. A composition of matter capable of forming on a base material when substantially dry a tightly adherent, impact resistant and fire resistant coating and comprising a dispersion comprising essentially water and solids, said solids comprising as essential ingredients on a dry weight basis from 22 to 52% by weight of an alkali metal silicate selected from the group consisting of sodium and potassium silicates and mixtures thereof, from 10 to 28% by weight of a rubbery copolymer of from 55 to 70% by weight of butadiene-1,3 and the balance acrylonitrile, from 21 to 67% by weight of a refractory and from about 1 to 8% by weight, based on the weight of said refractory, of a material selected from the group consisting of sodium and potassium carbonates and bicarbonates and mixtures thereof and said water being present in said dispersion in an amount of from 160 to 440% by weight based on the combined weight of said alkali metal silicate and said rubbery copolymer.

6. A fire resistant coating composition consisting essentially of about 30% by weight of an aqueous sodium disilicate solution (39% total solids), about 16% by weight of a latex (39% total solids) of a copolymer of about 55% butadiene-1,3 and 45% acrylonitrile, about 30% by weight of particulate fire clay, about 5% by weight of refiberized asbestos, 0.4% by weight of a 50–50 mixture of sodium and potassium carbonates, and the balance water.

7. A fire resistant coating composition consisting essentially of, by weight: about 37% of an aqueous sodium disilicate solution (39% total solids), about 15% of about 55–45 butadiene-1,3-acrylonitrile copolymer latex (39% total solids), about 27% of finely divided fire clay, about 5% of refiberized asbestos, about 0.36% of a 50–50 sodium carbonate-potassium carbonate eutectic mixture, and the balance water.

8. A fire resistant coating composition consisting essentially of by weight: about 52% of an aqueous sodium disilicate solution (39% total solids), about 28% of about 55–45 butadiene-1,3-acrylonitrile copolymer latex (39% total solids), about 8.6% of refiberized asbestos, about .69% of a 50–50 sodium carbonate-potassium carbonate eutectic mixture, and the balance water.

9. A fire resistant coating composition consisting essentially of by weight: about 39% of an aqueous sodium disilicate solution (39% total solids), about 21% of about 55–45 butadiene-1,3-acrylonitrile copolymer latex (39% total solids), about 39% of finely divided fire clay, about 2% of refiberized asbestos, and about .5% of a 50–50 sodium carbonate-potassium carbonate eutectic mixture.

10. An article of manufacture comprising a base member selected from the group consisting of metal, glass, wood and ceramic base members and a substantially dry, adherent, impact resistant and fire resistant composition as a coating on the surface thereof, said composition comprising as essential ingredients on a dry weight basis from 12 to 52% by weight of at least one alkali metal silicate, from 10 to 34% by weight of a rubbery polymer of at least about 50% by weight of an open chain conjugated diene hydrocarbon having from 4 to 8 carbon atoms and from 50 to 10% by weight of a monomer selected from the group consisting of acrylonitrile, methyl acrylonitrile, ethyl acrylonitrile and chloroacrylonitrile and mixtures thereof and from 21 to 74% by weight of a refractory.

11. An article of manufacture according to claim 10 wherein said composition contains additionally from about 1 to 8% by weight, based on the weight of said refractory, of a material selected from the group consisting of sodium and potassium carbonates and bicarbonates and mixtures thereof.

12. An article of manufacture according to claim 10 wherein said polymer in said composition contains additionally a copolymerized monomer selected from the group consisting of styrene, chlorostyrene, methyl acrylate, methyl methacrylate, ethyl acrylate, ethyl methacrylate, 2-vinyl pyridine, methyl vinyl ketone, vinylidene chloride and mixtures thereof.

13. An article of manufacture comprising a metallic base member and a substantially dry, adherent, impact resistant and fire resistant coating of a composition on the surface thereof, said composition comprising as essential ingredients on a dry weight basis from 12 to 52% by weight of an alkali metal silicate selected from the group consisting of sodium and potassium silicates and mixtures thereof, from 10 to 34% by weight of a rubbery copolymer of from about 50 to 90% by weight of an open chain conjugated diene hydrocarbon having from 4 to 8 carbon atoms and the balance a monomer selected from the group consisting of acrylonitrile, methyl acrylonitrile, ethyl acrylonitrile and chloroacrylonitrile and mixtures thereof, from 21 to 74% by weight of refractory and from 1 to 8% by weight, based on the weight of said refractory, of a material selected from the group consisting of sodium and potassium carbonates and bicarbonates and mixtures thereof.

14. An article of manufacture comprising a metallic base member and a substantially dry, tightly adherent, impact resistant and fire resistant coating of a composition on the surface thereof, said composition comprising as essential ingredients on a dry weight basis from 22 to 52% by weight of an alkali metal silicate selected from the group consisting of sodium and potassium silicates and mixtures thereof, from 10 to 28% by weight of a rubbery copolymer of from 55 to 70% by weight of butadiene-1,3 and the balance acrylonitrile, from 21 to 67% by weight of a refractory, and from about 1 to 8% by weight, based on the weight of said refractory, of a material selected from the group consisting of sodium and potassium carbonates and bicarbonates and mixtures thereof.

15. An article of manufacture comprising a metallic base member and a tightly adherent, impact resistant and fire resistant coating of a composition on the surface thereof, said composition exclusive of residual entrapped water and water of hydration consisting essentially of about 22% by weight of sodium silicate, about 12% by weight of a copolymer of about 55% by weight of butadiene-1,3 and 45% by weight of acrylonitrile, about 56% by weight of finely divided fire clay, about 9% by weight of refiberized asbestos, and about 0.75% by weight of a eutectic mixture of 50% sodium carbonate and 50% potassium carbonate.

16. An article of manufacture comprising a metallic base member and a tightly adherent, impact resistant and fire resistant coating composition on the surface thereof, said composition, exclusive of residual entrapped water and water of hydration, consisting essentially of by weight: about 27% of sodium disilicate, about 11% of about 55–45 butadiene-1,3-acrylonitrile copolymer, about 52% of finely divided fire clay, about 9% of refiberized asbestos, and about .7% of a 50–50% mixture of sodium and potassium carbonates.

17. An article of manufacture comprising a metallic base member and a tightly adherent, impact resistant and fire resistant coating composition on the surface thereof, said composition, exclusive of residual entrapped water and water of hydration, consisting essentially of by weight: about 50% of sodium disilicate, about 27% of about 55–45 butadiene-1,3-acrylonitrile copolymer, about 21% of refiberized asbestos, and about 1.7% of a 50–50% mixture of sodium and potassium carbonates.

18. An article of manufacture comprising a metallic base member and a tightly adherent, impact resistant and fire resistant coating composition on the surface thereof, said composition, exclusive of residual entrapped water and water of hydration, consisting essentially of by weight: about 23% of sodium disilicate, about 13% of about 55–45 butadiene-1,3-acrylonitrile copolymer, about 60% of finely divided fire clay, about 3% of finely divided asbestos, and about .8% of a 50–50% mixture of sodium and potassium carbonates.

References Cited in the file of this patent

UNITED STATES PATENTS

| | | |
|---|---|---|
| 2,467,192 | Cupery | Apr. 12, 1949 |
| 2,699,432 | Marra | Jan. 11, 1955 |

FOREIGN PATENTS

| | | |
|---|---|---|
| 697,705 | Great Britain | Sept. 18, 1951 |

OTHER REFERENCES

Hackh's Chemical Dictionary—3rd edition, page 316.